Oct. 7, 1952     W. J. R. JACKSON     2,612,818
ATTACHMENT FOR PROJECTORS FOR PROJECTING STEREOSCOPIC PICTURES
Filed June 9, 1950
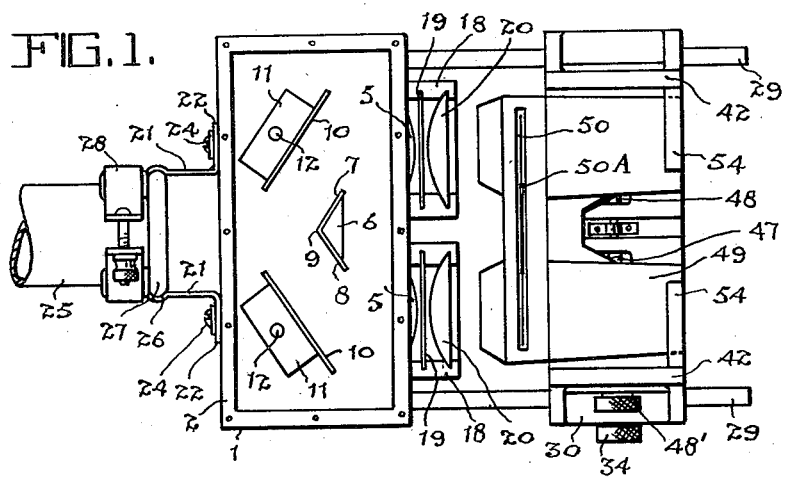
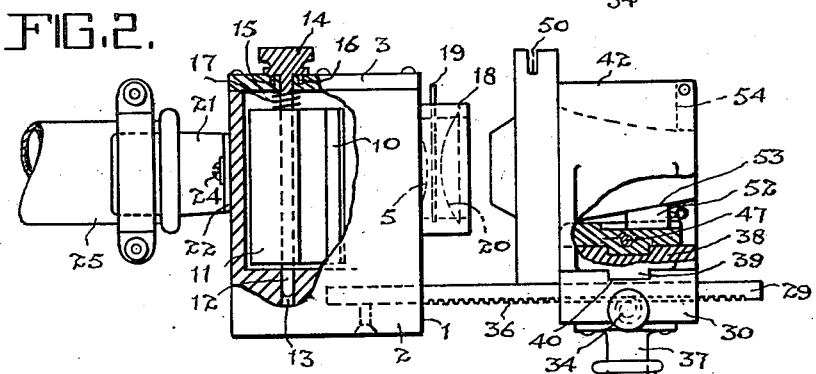
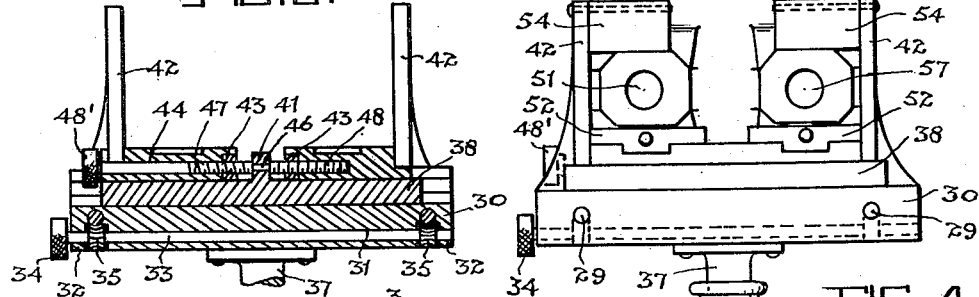
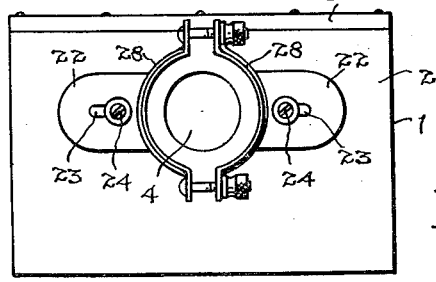
Inventor
William J. R. Jackson
by Douglas S. Johnson
atty Patented Oct. 7, 1952

2,612,818

UNITED STATES PATENT OFFICE 2,612,818

ATTACHMENT FOR PROJECTORS FOR PROJECTING STEREOSCOPIC PICTURES

William J. R. Jackson, Toronto, Ontario, Canada, assignor of fifty-one per cent to H. Sterling Ames, and ten per cent to Harold F. Halliday, both of Toronto, Ontario, Canada Application June 9, 1950, Serial No. 167,058

6 Claims. (Cl. 88—29)

This invention relates to a stereoscopic head particularly intended for use in the projection of stereoscopic pictures but adaptable also to stereoscopic photography.

The principal object of the invention is to provide an inexpensive unit which when used in conjunction with any standard single light projector and any of the commercial stereoscopic viewers will afford successful projection of stereoscopic slides or stereograms to bring the pleasure of stereoscopic projection to the person not desiring the expense of the present stereo projectors.

A further important object is to provide a stereoscopic head of the type referred which will be instantly adaptable to any standard projector and will afford a convenient and readily actuated mount for the viewer to be used in the stereogram projection.

A further object is to provide a head facilitating adjustment to accommodate the particular size or optical system of the viewer being used.

The principal feature of the invention consists in providing as a unit a stereo head incorporating a beam splitting device and means for polarizing the split beam, and a carriage adapted to receive a stereoscopic viewer slidably mounted for movement relative the beam splitting device and so aligned that light directed from the beam splitting device through the polarizing media is directed to be incident on and passed through the stereogram frames and lens systems of the viewer.

A further important feature consists in providing for adjusting of the beam splitting device to adjust the angle of the polarized beam to suit the particular viewer used.

A still further feature consists in forming the carriage as a clamp operable to grip a viewer to be used and controlled in operation to maintain its centre centrally between the polarized beams.

Still another feature consists in providing the clamp with means to compensate for variations of viewer shapes from the rectangular.

Referring to the accompanying drawings, Figure 1 is a plan view of a stereoscopic head or unit according to the invention with the cover of the beam splitting device removed.

Figure 2 is a part side elevational part sectional view of the device of Figure 1.

Figure 3 is a vertical sectional view taken transversely through the viewer mounting carriage.

Figure 4 is a front elevational view of the device.

Figure 5 is a rear elevational view.

Referring to the drawings, the beam splitting device 1 comprises a rectangular casing 2 having a removable cover 3. Formed in one wall of the casing is a central circular opening 4, while in the opposite wall spaced equally each side of the axis of the opening 4 are condensers 5.

Mounted within the casing in line with the axis of the opening 4 is a triangular block 6 formed with mirrored or reflecting faces 7 and 8 meeting in a vertical edge 9 on the axis of the opening 4, the reflector faces 7 and 8 being presented to light directed through the opening 4 to direct rays in opposite directions outwardly onto mirrors or reflectors 10 mounted on blocks 11. These blocks 11, as shown particularly in Figure 2, are secured on shafts 12 rotatably received in the bores 13 in the bottom of the casing 2, and extending through the top of the casing.

Mounted on the upper end of the shafts 12 above the cover 3 are knobs 14 which carry pin projections 15 engaging selectively in bores 16 in the cover. A spring 17 urges each of the shafts 12 in a direction to engage the pins 15 in the bores 16 to maintain the mirrors 10 fixed at the angle to which they are adjusted by pulling upwardly on the knob 14 and rotating to the desired setting of mirror angle.

The side mirrors 10 are set to reflect rays directed outwardly from the reflecting faces 7 in a reverse direction as two substantially parallel beams directed through the condenser lenses 5.

Removably mounted in frames 18 carried by the casing 2 in alignment with the condensers 5 are thin sheets 19 of polarizing media and condenser lenses 20. The polarizing media is such that the beams directed from the mirrors 10 are oppositely polarized upon passing through their respective lens systems comprising the lenses 5 and 20 and the polarizing media interposed therebetween.

Secured concentric with the opening 4 in the casing are a pair of curved clamping plates 21 having flanges 22 formed with slots 23 receiving the clamping screws 24. These clamping plates 21 are adapted to receive therebetween the head 25 of any standard projector, the slots 23 permitting adjustment of these plates into contact with the projector head, and the plates may be grooved at 26 to receive the annular bead 27 found on many of the standard projector heads.

A pair of U clamps 28 permit the clamp plates 21 to be securely forced against the projector head to provide a rigid connection between the projector head and the casing 2 with light directed from the projector passing through the opening 4 and incident on the reflecting faces 7 and 8.

Extending forwardly from the casing in the direction of the polarized beams are guide rods 29 on which are mounted a slide or carriage 30 having therethrough slots 31 to receive the guide rods 29 and provided with flanges 32 in which is journalled a shaft 33 operated by a knob 34 carrying pinions 35 to mesh with rack teeth 36 formed on the underside of the guide rods to effect movement of the carriage longitudinally of the guides.

Depending from the carriage 30 is a telescopic leg 37 which, together with the clamp arrangement engaging the head 25 of a projector, maintain the unit in rigidly supported relation in desired aligned position.

Mounted on the carriage 30 is a transverse slide 38 having a guide rib 39 received in the guide groove 40 of the carriage. Fixed centrally on this slide 38 is a boss 41 and mounted on either side thereof are right angled clamps 42 carrying oppositely threaded nut members 43 aligned with the boss 41 and with bores 44 through the clamps 42.

A screw operator 45 having a reduced portion 46 received in the boss 41 to maintain the screw against longitudinal movement is formed with oppositely threaded portions 47—48 engaging with the nut members 43 to effect upon rotation of the knurl grip 48' of the screw operator opposite movement of the clamps 42.

The transverse slide 38 is first set so that the boss 41 is accurately aligned with the axis of the opening 4 and with the vertical edge 9. Thereafter the clamps 42 are controlled by the screw operator to maintain equal distance from the axis of the opening 4 and hence equal distance from the beams directed outwardly of the beam splitting device.

Mounted between the clamps 42 is any form of stereoscopic viewer, one particular form being illustrated as 49. This viewer 49 provides a means of mounting a stereogram or stereoscopic picture pair, which means is simply a slot 50 in the viewer frame and comprises separate lens systems generally indicated at 51 which are made use of in the present invention to bring the polarized light directed through the picture pairs of a stereogram 50A to focus on a suitable polarized screen (not shown).

In the particular form of viewer disclosed the viewer is used in the reverse direction to its normal use as a viewer, and any opaque matter in front of the stereogram slide is removed. The light will be transmitted through the viewer. As the viewer itself forms no part of this invention and as any form of viewer may be used, no further showing is deemed necessary.

In the particular form of viewer the separate lens system 51 provides a deviation of the shape of the viewer from the rectangular. Bevelled slides 52 removably mounted on the clamps 42 are arranged to engage the angled surfaces 53 of the viewer to provide firm support for the viewer as it is gripped between the clamps and beneath the pivotal locking plates 54. It will be appreciated that variations in the form of the carriage 30 may be made, and if desired a separate stereogram mount and lens adapted particularly for the unit may be formed as part of the carriage if desired rather than making use of the present commercial viewers without departing from the scope of the invention.

Further, a light source may be incorporated as part of the beam splitting unit to form the unit into a complete stereoscopic projector. However, its prime importance resides in its simplest form of a beam splitting device and carriage mount wherein it serves as a conversion unit for use with the standard projector and commercial viewer to project stereograms while eliminating the expense of the present dual lens projector devices.

It will be noted that in projection with the present device the light beam is split before passing through the picture pairs of the stereogram 50A so that each picture will be projected without interference from the other. Further, in splitting the beam the adjustment of the mirrors 10 permits the beams to be adjusted in angle to suit the particular form of viewer and size of stereogram used in projection. This adjustment, together with the sliding arrangement of the carriage 30, permits accurate control of the projection and focussing on the polarizing screen to provide a very successful projection device.

What I claim as my invention is:

1. The combination with a source of beamed light and a stereoscopic viewer having left and right eye optical systems and mounting means for supporting stereoscopic picture pairs with each picture in the field of vision from one of said optical systems, of an attachment for converting said light source and viewer into a stereoscopic projection system, said attachment comprising a beam splitting device for converting light from said source into a pair of separated substantially parallel directed beams spaced corresponding to the separation of the optical system of said viewer, means associated with said device effecting different polarization of said directed beams, guide means secured to and extending forwardly of said beam-splitting device in the direction of said directed beams, a carriage movable longitudinally of said guide means and arranged transversely of said beams, and clamping means on said carriage movable in clamping action in opposition in a direction transverse of said directed beams to clamp said viewer with each of said separate optical systems aligned with one of said pair of directed beams.

2. An attachment for use in stereoscopic projection comprising a beam splitting unit consisting of a casing having a plurality of openings therein, a pair of reflecting surfaces located to receive light rays entering one of said openings and meeting in a vertical edge opposite thereto and obtusely arranged to direct light rays falling thereon outwardly in opposite directions from said edge, and a second pair of obtusely arranged reflecting surfaces mounted within said casing in the path of said outwardly directed light rays to reflect same in a reverse direction as a pair of substantially parallel light beams through other of said openings, condenser lenses and polarizing media arranged in the path of said light beams, a guideway extending outwardly from said casing in the direction of said beams, a carriage slidably mounted on said guideway, a pair of clamps mounted on said slide and movable thereon transversely of said guideway, and means to operate said clamps while permitting said clamps to maintain equal spacing from a point midway between said light beams.

3. A device as claimed in claim 2 in which said second pair of reflecting surfaces are blocks mounted on shafts extending through said casing, means for rotating said shafts from without said casing, and stop means to maintain said blocks in desired position of rotation.

4. A device as claimed in claim 2 in which said clamps are mounted on a slide movable transversely of said guideway.

5. A device as claimed in claim 2 in which said means to operate said clamps comprises left and right hand threaded nut members carried one on each of said clamps, and a screw anchored against longitudinal movement operating in said nut members respectively and formed with corresponding left and right hand threaded portions.

6. A device as claimed in claim 2 in which said casing is provided with a pair of clamp plates of curved form and concentric with said opening through which light rays are received, slotted flanges extending right angularly from said clamp plates, means extending through the slots of said flanges to secure same to said casing while permitting the clamp plates to move radially of said latter opening.

WILLIAM J. R. JACKSON.

REFERENCES CITED

The following references are of record in the file of this patent:

UNITED STATES PATENTS

| Number | Name | Date |
| --- | --- | --- |
| 953,879 | Williams | Apr. 5, 1910 |
| 1,503,766 | Pictet et al. | Aug. 5, 1924 |
| 1,655,850 | Watts | Jan. 10, 1928 |
| 1,948,901 | Brombach | Feb. 27, 1934 |
| 2,268,338 | Kober et al. | Dec. 30, 1941 |
| 2,289,521 | Rose | July 14, 1942 |
| 2,314,174 | Steinman | Mar. 16, 1943 |

FOREIGN PATENTS

| Number | Country | Date |
| --- | --- | --- |
| 160,512 | Great Britain | Mar. 16, 1921 |